(12) United States Patent
Grolimund

(10) Patent No.: US 12,510,115 B2
(45) Date of Patent: Dec. 30, 2025

(54) LINEAR GUIDE DEVICE

(71) Applicant: Schneeberger Holding AG, Roggwil (CH)

(72) Inventor: Thomas Grolimund, Langenthal (CH)

(73) Assignee: Schneeberger Holding AG, Roggwil (CH)

( * ) Notice: Subject to any disclaimer, the term of this patent is extended or adjusted under 35 U.S.C. 154(b) by 94 days.

(21) Appl. No.: 18/436,156

(22) Filed: Feb. 8, 2024

(65) Prior Publication Data

US 2024/0280139 A1 Aug. 22, 2024

Related U.S. Application Data

(60) Provisional application No. 63/485,606, filed on Feb. 17, 2023.

(30) Foreign Application Priority Data

Jun. 15, 2023 (EP) .................................... 23179580

(51) Int. Cl.
*F16C 29/04* (2006.01)
*F16C 29/00* (2006.01)
(Continued)

(52) U.S. Cl.
CPC ........ *F16C 29/005* (2013.01); *F16C 33/3837* (2013.01); *F16H 19/04* (2013.01)

(58) Field of Classification Search
CPC ...... F16C 29/005; F16C 29/04; F16C 29/043; F16C 29/045; F16C 33/306; F16C 33/40; F16C 33/48; F16H 19/04
See application file for complete search history.

(56) References Cited

U.S. PATENT DOCUMENTS 2,400,374 A * 5/1946 Alf .......................... F16C 29/04
384/49
5,076,715 A 12/1991 Saoyama et al.
(Continued)

FOREIGN PATENT DOCUMENTS

DE 41 42 821 A1 7/1992
DE 4217663 A * 12/1992
(Continued)

OTHER PUBLICATIONS

European Search Report dated Nov. 27, 2023 in European Application No. 23179580.8, with English translation of relevant parts.

*Primary Examiner* — Phillip A Johnson
(74) *Attorney, Agent, or Firm* — Collard & Roe, P.C.

(57) ABSTRACT

A linear guide device includes a rail that has a first advancing device extending along a longitudinal direction, a carriage that can be displaced relative to the rail along the longitudinal direction and has a second advancing device extending along the longitudinal direction, a cage that can be displaced relative to the rail and the carriage along the longitudinal direction and a coupling element that is designed for simultaneously engaging into the first and the second advancing device in order to cause a movement of the cage relative to the rail and/or the carriage when the carriage is advanced relative to the rail along the longitudinal direction. The coupling element has at least one projection that interacts with a stopping face formed on the rail and/or the carriage in order to retain the coupling element in the linear guide device.

15 Claims, 4 Drawing Sheets

(51) Int. Cl.
    *F16C 33/38*     (2006.01)
    *F16H 19/04*     (2006.01)

(56) References Cited

U.S. PATENT DOCUMENTS

| | | | |
|---|---|---|---|
| 5,384,202 A | 1/1995 | Agari | |
| 5,466,069 A | 11/1995 | Agari | |
| 6,692,151 B2 | 2/2004 | Vegh et al. | |
| 6,971,797 B2 * | 12/2005 | Obara | F16C 33/543 |
| | | | 384/47 |
| 11,019,926 B2 * | 6/2021 | Mattern | B65G 21/22 |

FOREIGN PATENT DOCUMENTS

| | | | | |
|---|---|---|---|---|
| DE | 10 2004 034 965 A1 | 2/2006 | | |
| DE | 10 2015 205 922 A1 | 10/2016 | | |
| EP | 1 277 976 A2 | 1/2003 | | |
| EP | 1 536 152 A2 | 6/2005 | | |
| JP | 56059020 A * | 5/1981 | | |
| JP | 2001-165160 A | 6/2001 | | |
| JP | 2003-262224 A | 9/2003 | | |
| JP | 2010175033 A * | 8/2010 | | F16C 29/04 |

* cited by examiner

LINEAR GUIDE DEVICE

CROSS REFERENCE TO RELATED APPLICATIONS

This application is a non-provisional application that hereby claims priority under 35 U.S.C. 119 (e) from U.S. Provisional Patent Application Ser. No. 63/485,606 filed Feb. 17, 2023 and claims priority under 35 U.S.C. $119 of European Application No. 23179580.8 filed on Jun. 15, 2023, the disclosures of which are incorporated by reference.

BACKGROUND OF THE INVENTION

1. Field of the Invention

The present invention pertains to a linear guide device.

2. Description of the Related Art

Linear guide devices are used in many different fields of application, e.g. in profile rails, measuring systems, linear tables, roller tables, positioning systems, etc.

A linear guide device is also referred to as a linear guide and generally comprises a rail that may be mounted, e.g., stationarily and a slide or carriage or a table, which can be moved linearly back and forth in a longitudinal direction of the linear guide device by means of rolling bodies that are rotatably mounted on a cage. The rolling bodies provided on the cage abut on the rail and also on the carriage in a rollable manner such that the cage moves relative to the rail, as well as relative to the carriage, by a defined amount or stroke during a movement of the carriage relative to the rail.

In this case, the cage stroke ideally corresponds to half of the respective table stroke or carriage stroke. However, the occurring cage stroke actually deviates from this ideal value, i.e. the cage shifts, which is also referred to as cage creep. During the stroke movements being carried out, the cage therefore typically creeps continuously in one direction, namely mostly downward in a vertical installation of the linear guide device, in small increments per stroke. This cage creep can decisively impair the guiding function of the linear guide device. An optimal load distribution particularly may no longer be realized due to the cage creep. If the full stroke is required after multiple smaller strokes, the cage abuts on end parts of the linear guide device and can no longer be smoothly extended such that the guide can only be additionally displaced with an increased expenditure of force. This may lead to damages such as abrasion of sliding surfaces on the track or the rolling bodies or deformations of the cage and can even cause rolling bodies to fall out, bending or breaking of the end parts and damages to the driving elements.

The cage creep is also promoted by other factors such as inaccurate rail, track and rolling body geometries, a vertical installation of the linear guide device, uneven prestresses (installation error), occurring accelerations, unfavorable work cycles, temperature differences, connecting constructions, as well as uneven load distributions.

The cage creep can be prevented by providing a positive cage control, which is also referred to as restricted cage guidance and causes the cage to always be displaced by half of the stroke.

DE 10 2015 205 922 A1 describes a linear drive that has a driving carriage, which is displaceably mounted on a drive housing by means of a rolling guide device in order to carry out a stroke movement. A coupling roller is rotatably mounted on a cage body of the rolling guide device and at the same time abuts on rolling surfaces of the drive housing and the driving carriage. The outer surface of the coupling roller or one of the rolling surfaces is elastically pliable such that the coupling roller is pressed against the two rolling surfaces with prestress while simultaneously realizing a tolerance compensation.

U.S. Pat. No. 5,076,715 describes a linear guide unit with a U-shaped table and a U-shaped rail, as well as a mounting with rolling bodies in the form of balls for realizing a relative linear movement between table and rail. In order to prevent slippage, a gearwheel engaging into gear racks of the table and the rail is arranged on the mounting.

SUMMARY OF THE INVENTION

An objective of the present invention can be seen in respectively making available an alternative or improved linear guide device, in which cage creep can be prevented and/or an assembly and an installation of the linear guide device can be simplified.

This objective is attained with a linear guide device according to claim 1. Enhancements of the invention are specified in the dependent claims.

An inventive linear guide device comprises a rail that has a first advancing device extending along a longitudinal direction, a carriage that can be displaced relative to the rail along the longitudinal direction and has a second advancing device extending along the longitudinal direction, a cage that can be displaced relative to the rail and the carriage along the longitudinal direction and a coupling element that is designed for simultaneously engaging into the first and the second advancing device in order to cause a movement of the cage relative to the rail and/or the carriage when the carriage is advanced relative to the rail along the longitudinal direction. The coupling element has at least one projection that interacts with a stopping face formed on the rail and/or the carriage in order to retain the coupling element in the linear guide device. In this linear guide device, the coupling element preferably is not fastened on the cage such that the coupling element is mounted in a floating manner.

The at least one projection of the coupling element preferably abuts on the stopping face of the rail and/or the carriage in a spaced-apart manner, particularly when the carriage carries out a movement relative to the rail in the longitudinal direction, which is also referred to as a stroke movement. The at least one projection of the coupling element preferably forms a shoulder that is designed for preventing an undesirable displacement of the coupling element. When the carriage carries out the movement relative to the rail, for example, the at least one projection can contact the stopping face and thereby laterally retain the coupling element in a dragging manner. The at least one projection and the stopping face make it possible, for example, to retain the coupling element in the linear guide device in a form-fitting or spaced-apart manner.

It is preferred that the coupling element is stationarily mounted or retained in the linear guide device solely due to the interaction of the at least one projection with the stopping face. The coupling element preferably is not connected to the cage and/or the linear guide device does not comprise a mounting that retains or fastens the coupling element on the cage. In other words, the interaction of the at least one projection with the stopping face preferably prevents a movement of the coupling element in at least a direction transverse, preferably perpendicular, to the longitudinal direction of the linear guide device. The linear guide device at the same time allows a movement of the coupling element relative to the rail and/or the carriage in the longitudinal direction. The coupling element therefore is mounted in the linear guide device in a floating manner. In this case, the coupling element preferably acts as a driver that causes the movement of the cage, which is also referred to as cage stroke, during an advance (stroke movement) of the carriage relative to the rail. In this way, a positive cage control or restricted cage guidance can be realized.

The linear guide device particularly may be a miniature linear guide device. For example, the assembly of a linear guide device, particularly a miniature linear guide device, can be simplified due to the mounting-free installation of the coupling element, i.e. particularly without retaining the coupling element on the cage by means of its axles or projections.

The coupling element preferably is realized in the form of a gearwheel that is arranged in the linear guide device so as to be rotatable about a rotational axis, wherein the rotational axis extends transverse, preferably perpendicular, to the longitudinal direction and the at least one projection extends away from the gearwheel in the direction of the rotational axis. Alternatively or additionally, the first and/or second advancing structure preferably is realized in the form of a gear rack. The design of the coupling element in the form of a gearwheel and/or the design of the advancing structure in the form of a gear rack make it possible, for example, to easily realize and/or make available a cost-effective positive cage control or restricted cage guidance.

The cage preferably has a recess, through which the coupling element extends, wherein the projection of the coupling element abuts on a boundary of the recess in order to cause the movement of the cage relative to the rail and/or the carriage. This makes it possible, for example, to easily couple the movement of the cage (cage stroke) with the movement of the carriage and/or the rail.

It is preferred that the at least one projection of the coupling element essentially is designed cylindrically, wherein a diameter of the cylindrical projection is smaller than a diameter of the coupling element. It is furthermore preferred that a cylinder axis of the cylindrical projection extends parallel, particularly is identical, to a rotational axis of the coupling element. For example, a cylindrical projection can allow a sliding or dragging movement of the projection on the stopping face during a relative movement between the cage and the carriage and/or rail and/or reduce friction-related losses.

The stopping face preferably is a boundary of the carriage and/or the rail that faces the cage, particularly an underside of the carriage and/or an upper side of the rail, in order to prevent a movement of the coupling element in the direction of the rail and/or the carriage. A radial circumferential surface of the cylindrical projection preferably abuts on the stopping face. This makes it possible, for example, to respectively prevent a vertical movement of the coupling element or to retain the coupling element stationarily in the vertical direction.

Alternatively or additionally, the rail and/or the carriage preferably has a groove, particularly a groove extending in the longitudinal direction and/or laterally of the first or second advancing device, and the stopping face is formed by a wall of the groove in order to prevent a movement of the coupling element parallel to the carriage and/or the rail. The groove may be realized, in particular, the form of a depression that is formed in the underside of the carriage and/or in the upper side of the rail, wherein one lateral surface of the groove preferably serves as the stopping face. This respectively makes it possible, for example, to prevent a horizontal movement of the coupling element or to retain the coupling element stationarily in the horizontal direction. An axial boundary of the cylindrical projection preferably abuts on the stopping face.

It is furthermore preferred that the coupling element has at least a first projection, which abuts on the groove of the rail and/or the carriage, and a second projection, which abuts on the boundary of the carriage and/or the rail facing the cage, wherein a dimension, particularly a diameter, of the first projection preferably is greater than a dimension, particularly a diameter, of the second projection. For example, the first and/or second projection may form a shoulder that can prevent an undesirable displacement of the coupling element in the horizontal and/or vertical direction, i.e. generally a displacement perpendicular to the longitudinal direction. The at least one projection (shoulder) respectively can contact the groove or the boundary facing the cage during a movement of the carriage relative to the rail and thereby retain the coupling element in a laterally dragging manner.

The cage preferably is arranged between the rail and the carriage. It is preferred that the cage alternatively or additionally has a plurality of rolling bodies that respectively abut on the carriage and on the rail in a rollable manner. This makes it possible, for example, to easily realize a rolling body guidance for a movement of the carriage relative to the rail. The rolling bodies, which also referred to as rolling elements, preferably are mounted in the cage rotatably, wherein each rolling body simultaneously abuts on a guide track of the carriage and a guide track of the rail in a rollable manner. This makes it possible, for example, to move the cage relative to the rail and also relative to the carriage during a stroke movement of the carriage relative to the rail in the longitudinal direction, particularly by half of the stroke. The carriage preferably is supported on the rolling bodies perpendicular to the longitudinal direction and the cage is supported on the rail via the rolling bodies.

The cage preferably has a base body, preferably an essentially planar base body, and two legs extending away from the base body, preferably perpendicularly, wherein said legs are designed for receiving the rail in an intermediate space formed between the legs. Alternatively or additionally, the carriage is designed in an essentially U-shaped manner in a plane extending perpendicular to the longitudinal direction, wherein the legs of the U-shaped carriage are designed for receiving the cage in an intermediate space formed between the two legs.

This makes it possible, for example, to provide an essentially U-shaped cage. It is preferred that a recess, through which the coupling element extends, is provided on the base body of the cage and/or that the rolling bodies are provided on the legs of the cage.

On their inner side, the legs of the carriage preferably have a track, along which the rolling bodies can move. The rail preferably has a track, along which the rolling bodies can move. It is preferred that the carriage has a base body, particularly an essentially planar base body, on which the legs are provided. The second advancing device and/or the stopping face preferably are provided on the base body of the carriage.

The linear guide device may also be designed inversely, i.e. the legs of the cage may be designed for receiving the carriage in the intermediate space formed between these legs and the rail may be designed in a U-shaped manner and receive the cage in an intermediate space formed between its legs.

It is preferred that the linear guide device furthermore comprises a limit stop that limits the movement of the cage relative to the rail and/or the carriage in the longitudinal direction, wherein the limit stop preferably is realized in the form of an oblong opening formed in the cage and a screw, a pin or another protruding geometry, which extends through the opening and is fastened on the rail or the carriage. This makes it possible, for example, to easily limit a movement of the cage in the longitudinal direction.

It is furthermore preferred that the linear guide device comprises a drive that is designed for driving the carriage such that it can be displaced relative to the rail along the longitudinal direction.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
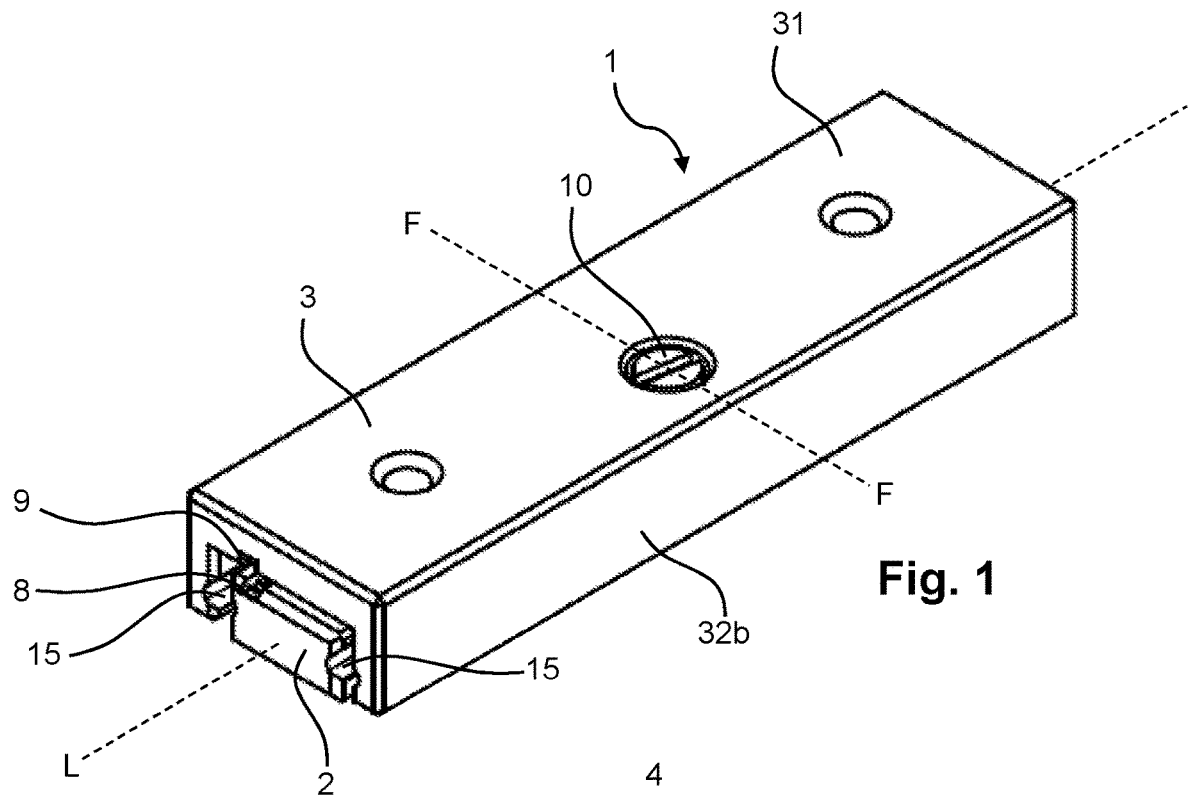
FIG. 1 shows a schematic perspective view of a linear guide device according to an embodiment of the present invention.

A linear guide device according to an embodiment of the present invention is described below with reference to FIGS. 1 to 8.

The linear guide device 1 has a rail 2, a slide or carriage 3 and a cage 4 arranged between the rail 2 and the carriage 3. The rail 2, the carriage 3 and the cage 4 have a common longitudinal axis L. A plurality of rolling bodies 5 is provided on the cage 4, wherein said rolling bodies respectively abut on the carriage 3 and the rail 2 in a rollable manner. Consequently, the cage 4 is arranged on the rail 2 so as to be movable in the longitudinal direction L and the carriage 3 is arranged on the cage 4 so as to be movable in the longitudinal direction L. The cage 4 is concealed by the carriage 3 in the illustration according to FIG. 1.

The linear guide device 1 furthermore has a coupling element in the form of a gearwheel 6 that extends through a recess 7 formed in the cage 4 in order to engage into respective advancing devices of the rail 2 and the carriage 3, wherein said advancing devices are realized in the form of gear racks 8,9.

In the present embodiment, the rail 2 has an upper side 11 that respectively faces the cage 4 and the carriage 3. The rail 2 furthermore has two lateral surfaces 12, each one of which respectively faces one of the legs 22a, 22b of the cage 4 described further below.

The rail 2 has the gear rack 8, into which the gearwheel 6 engages, on its upper side 11. The gear rack 8 extends in the longitudinal direction L on the upper side 11 of the rail 2. The gear rack 8 is not arranged centrally with respect to a center axis of the rail 2 extending in the longitudinal direction L. In other words, the gear rack 8 is with respect to the center axis arranged offset in the direction of one side of the carriage. The rail 2 furthermore has two grooves 13 (see FIGS. 6, 8) extending in the longitudinal direction L on its upper side 11. In the present embodiment, the grooves 13 respectively are arranged laterally of the gear rack 8 on the upper side 11 of the rail. The grooves 13 are designed open in the direction of the cage 4, i.e. toward the top in the present embodiment. They are designed for receiving a first projection 43 of the gearwheel 6 described further below. In this case, a sidewall 13a of the groove serves as a stopping face for the first projection 43 of the gearwheel (see FIGS. 6, 8).

A respective depression 14 is optionally provided in the upper side 11 laterally of the grooves 13 (see FIGS. 6, 8), wherein said depressions serves as a stopping face for the second projections 44 of the gearwheel 6 as described in greater detail below. Alternatively, the upper side 11 may also be realized without the depressions 14 and the second projections 44 of the gearwheel 6 may directly abut on the upper side 11, which in this case forms the stopping face.

Figure 2:
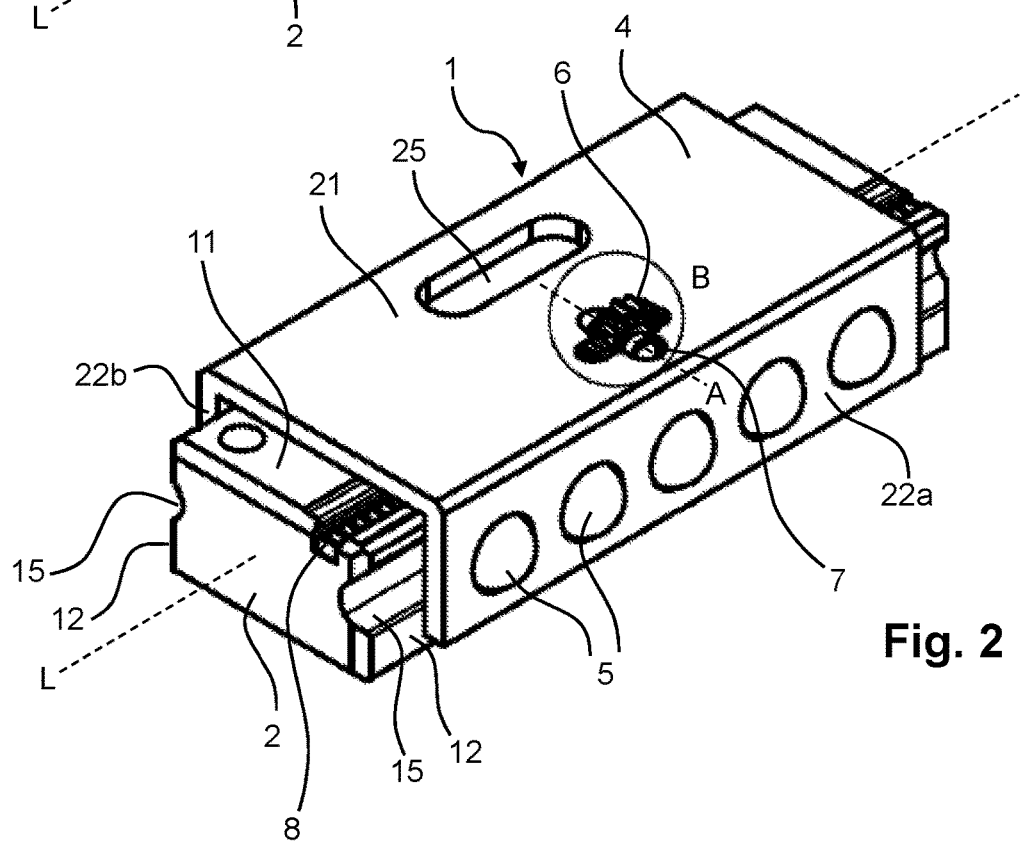
FIG. 2 shows a schematic perspective view of the linear guide device illustrated in FIG. 1 without carriage.

A respective track 15 extending in the longitudinal direction L is provided on the lateral surfaces 12 of the rail 2, wherein the rolling bodies 5 of the cage 4 abut on said tracks in a rollable manner. In FIGS. 1 and 2, the track 15 is respectively realized in the form of a projection, which is provided on the lateral surface 12 and on which the rolling bodies rest. The cage 4 is supported on the tracks 15 of the rail with its rolling bodies 5.

The rail 2 preferably is mounted in a fixed manner, e.g. in a machine tool, a measuring system, etc.

The cage 4 essentially is designed in a U-shaped manner in a cross section through the linear guide device 1 perpendicular to the longitudinal direction L. The cage 4 specifically comprises a base body or a base plate 21, which in the present embodiment essentially is designed in a planar manner, and two legs 22a, 22b that extend away from the base plate 21, preferably perpendicularly. The legs 22a, 22b are designed in such a way that an intermediate space, in which the rail 2 is at least partially received, is formed between the legs. In the present embodiment of the linear guide device 1, the cage 4 is attached to the rail 2 in the form of an inverted U-shape (i.e. with the base plate 21 pointing upward and the opening of the U-shape pointing downward).

The base plate 21 of the cage 4 has the aforementioned recess 7, through which the gearwheel 6 extends.

The base plate 21 of the cage 4 furthermore has an opening 25 (see FIG. 2) that is designed in an oblong manner in the longitudinal direction L of the linear guide device 1. A screw 10 (see FIGS. 1, 7) fastened on the rail 2 or the carriage 3 extends through this opening 25. The ends of the oblong opening 25 in the longitudinal direction L form a limit stop that limits the movement of the cage 4 relative to the rail 2 and/or the carriage 3 in the longitudinal direction L.

The rolling bodies 5 of the cage 4 are respectively arranged on the legs 22a, 22b of the cage. To this end, the rolling bodies 5 are rotatably mounted in the legs 22a, 22b of the cage 4 and spaced apart from one another, preferably equidistantly, along the longitudinal direction L. For example, the rolling bodies 5 may be realized in the form of balls and/or rollers. They protrude from the legs 22a, 22b toward the inner side and also toward the outer side of the U-shaped cage 4 such that they abut on the tracks 15, 33 of the rail 2 and the carriage 3 in a rollable manner. Consequently, the cage 4 is arranged so as to be movable relative to the rail 2 and therefore also relative to the carriage 3 in the longitudinal direction L.

Similar to the cage 4, the carriage 3 essentially is designed in a U-shaped manner in a cross section of the linear guide device 1 perpendicular to the longitudinal direction L. The carriage 3 specifically comprises a base body or a base plate 31, which in the present embodiment essentially is designed in a planar manner, and two legs 32a, 32b that extend away from the base plate 31, preferably perpendicularly. The legs 32a, 32b are designed in such a way that an intermediate space, in which the cage 4 is at least partially received, is formed between the legs. In the embodiment of the linear guide device 1 illustrated in the figures, the carriage 3 is attached to the cage 4 in the form of an inverted U-shape (i.e. with the base plate 31 pointing upward and the opening of the U-shape pointing downward).

The carriage 3 has the gear rack 9, into which the gearwheel 6 engages (see FIGS. 6, 8), on the underside 34 of the base plate 31, i.e. on the boundary of the base plate 31 facing the cage 4 and the rail 2. The gear rack 9 extends in the longitudinal direction L on the underside 34 of the base plate 31. The gear rack 9 is not arranged centrally with respect to a center axis of the carriage 3 extending in the longitudinal direction L. In other words, the gear rack 9 is with respect to the center axis arranged offset in the direction of one side of the carriage. The underside 34 of the base plate 31 furthermore has two grooves 35 (see FIGS. 6, 8) extending in the longitudinal direction L. In the present embodiment, the grooves 35 respectively are arranged laterally of the gear rack 9 on the underside 34 of the base plate 31. The grooves 35 are designed open in the direction of the cage 4, i.e. toward the bottom in the present embodiment. They are designed for receiving the first projection 43 of the gearwheel 6 described further below. In this case, a sidewall 35a of the groove serves as stopping face for the first projection 43 of the gearwheel (see FIGS. 6, 8).

A respective depression 36 is optionally provided in the underside 34 of the base plate 31 laterally of the grooves 35 (see FIGS. 6, 8), wherein said depressions serves as a stopping face for the second projections 44 of the gearwheel 6 as described in greater detail below. Alternatively, the underside 34 of the base plate 31 may also be realized without the depressions 36 and the second projections 44 of the gearwheel 6 may directly abut on the underside 34 of the base plate 31, which in this case forms the stopping face.

The carriage 3 has tracks 33 extending in the longitudinal direction L on the inner side of the legs 32a, 32b, i.e. on the side of the legs facing the cage 4, wherein the rolling bodies 5 of the cage 4 abut on said tracks in a rollable manner. The carriage is supported on the rolling bodies 5 of the cage 4 with the tracks 33.

The linear guide device 1 furthermore has a drive that is not illustrated in greater detail in the figures and designed for driving the carriage 3 such that it can be displaced relative to the rail 2 along the longitudinal direction L.

Figure 4:
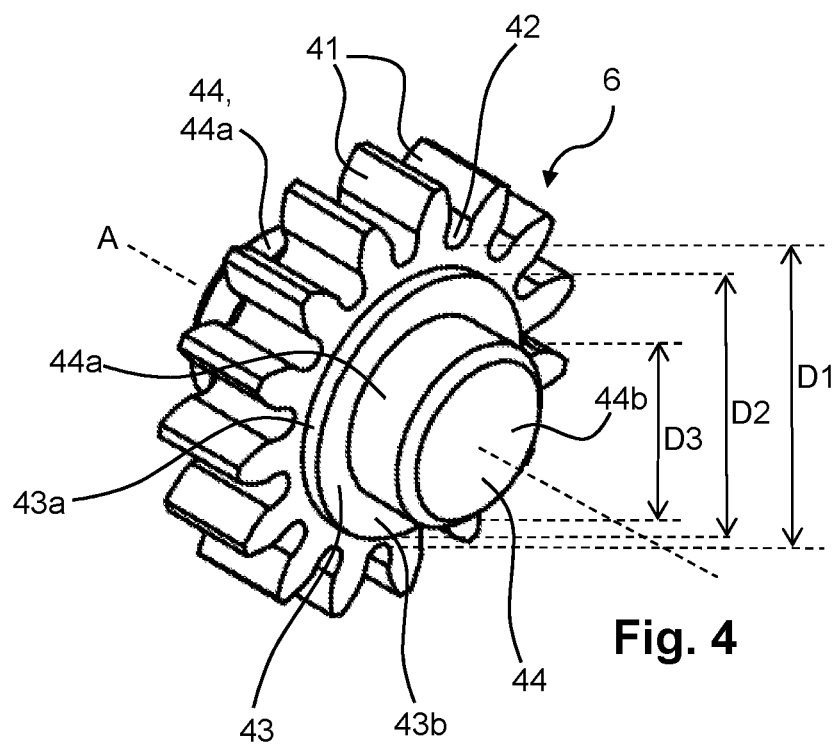
FIG. 4 shows a schematic perspective view of a coupling element provided in the linear guide device illustrated in FIGS. 1-3.
Figure 5:
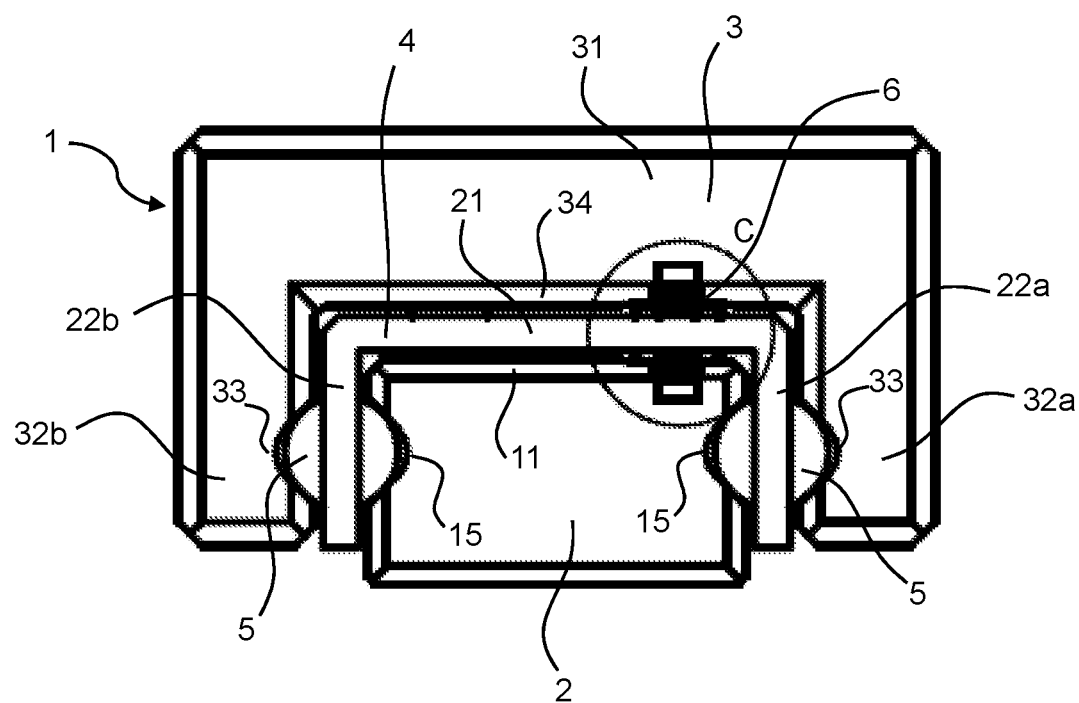
FIG. 5 shows a schematic view of the linear guide device illustrated in FIGS. 1-4 in the form of a top view from the front.

The gearwheel 6 is described in greater detail below with reference to FIG. 4. The gearwheel 6 is arranged in the linear guide device 1 so as to be rotatable about a rotational axis A, wherein the rotational axis A extends perpendicular to the longitudinal direction L (see also FIG. 2). The gearwheel 6 comprises a plurality of teeth 41 that are spaced apart from one another in the circumferential direction by gaps 42 and designed for engaging into the gear racks 8, 9 of the rail 2 and the carriage 3 (see FIGS. 2, 5-8). The bases of the gaps 42 define a first diameter D1 of the gearwheel 6.

The gearwheel 6 furthermore has a first projection 43, which is designed for simultaneously abutting on the groove 13 of the rail 2 and on the groove 35 of the carriage 3, and a second projection 44, which is designed for simultaneously abutting on the upper side 11 of the rail 2 or the depression 14 formed therein and on the underside 34 of the carriage 3 or the depression 36 formed therein.

In the present embodiment, the first projection 43 and the second projection 44 respectively are designed cylindrically with the rotational axis A of the gearwheel as cylinder axes. Each of the projections 43, 44 specifically has a circumferential surface 43a, 44a forming the lateral area of the cylindrical projection and an end face 43b, 44b forming the base area of the cylindrical projection.

Viewed perpendicular to the rotational axis A, the first projection 43 has a second diameter D2 that is smaller than the first diameter D1 of the gearwheel 6. The second projection 44 has, viewed perpendicular to the rotational axis A, a third diameter D3 that is smaller than the first diameter D1 of the gearwheel 6 and in the present embodiment also smaller than the second diameter D2 of the first projection 43. The first projection 43 is arranged on the gearwheel 6 and extends away from the gearwheel 6 in the direction of the rotational axis A. The second projection 44 is arranged on the first projection 43 and extends away from the first projection 43 in the direction of the rotational axis A.

A width of the first projection 43 in the direction of the rotational axis A is chosen in such a way that the end face 43b of the first projection abuts or essentially abuts on the sidewall 13a of the groove 13 of the rail 2 and on the sidewall 35a of the groove 35 of the carriage 3 when the gearwheel is arranged in the linear guide device 1. The third diameter D3 of the second projection 44 is chosen in such a way that its circumferential surface 44a abuts on the depression 14 in the upper side 11 of the rail 2 or on the upper side 11 itself and on the depression 36 in the underside 34 of the carriage 4 or on the underside 34 of the carriage itself when the gearwheel 6 is arranged in the linear guide device 1. The sidewalls 13a, 35a of the grooves 13, 35 therefore serve as stopping faces for the first projection 43 or its end face 43b and the depressions 14, 36 or the upper side 11 of the rail 2 and the underside 34 of the carriage 3 serve as stopping faces for the second projection 44 or its circumferential surface 44a.

In the present embodiment, the gearwheel respectively has two first projections 43 and two second projections 44, which are arranged in pairs on opposite sides of the gearwheel 6 along the rotational axis A. The rear projections are partially concealed by the gearwheel in the illustration according to FIG. 4.

Figure 3:
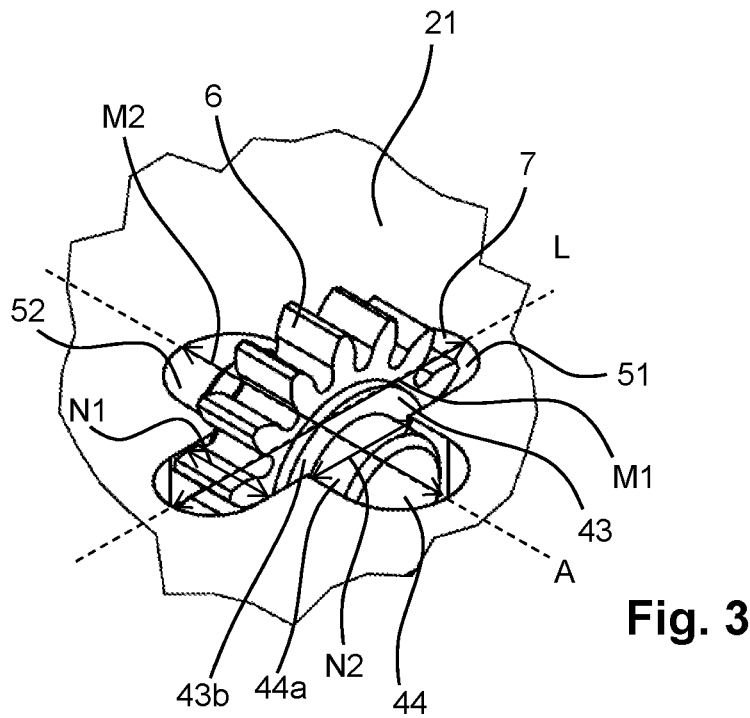
FIG. 3 shows a schematic and enlarged perspective view of the region of the linear guide device identified by the reference symbol B in FIG. 2.

The recess 7 in the base plate 21 of the cage 4, through which the gearwheel 6 extends, is described in greater detail below with reference to FIGS. 3 and 4. The recess 7 has a first recess section 51 and a second recess section 52, which are respectively designed in an oblong manner and intersect one another perpendicularly or crosswise. The first recess section 51 is designed for receiving the gearwheel 6 with the first projections 43 provided thereon and the second recess section 52 is designed for receiving the second projections 44 of the gearwheel 6.

The first recess section 51 specifically extends along the longitudinal direction L of the linear guide device 1 over a length M1 that is greater than a width N1 of the first recess section 51 perpendicular to the longitudinal direction L. The length M1 of the first recess section 51 is greater than a maximum diameter of the gearwheel 6, which is defined by the free ends of the teeth 41 of the gearwheel, such that the gearwheel 6 is freely rotatable about its rotational axis A when it is arranged in the recess 7. The width N1 of the first recess section 51 is greater than or equal to a width of the gearwheel 6 between the end faces 43b of the first projections 43, which are arranged on opposite sides of the gearwheel 6, along the rotational axis A.

The second recess section 52 extends perpendicular to the longitudinal direction L of the linear guide device 1 (i.e. along the rotational axis A of the gearwheel 6) over a length M2 that is greater than a width N2 of the second recess section 52 in the longitudinal direction L. The length M2 of the second recess section 52 is greater than a total width of the gearwheel 6 between the end faces 44b (see FIG. 4) of the second projections 44, which are arranged on opposite sides of the gearwheel 6, along the rotational axis A. The width N2 of the second recess section 52 is greater than or equal to the third diameter D3 of the second projection 44 of the gearwheel 6.

The second recess section 52 is designed in such a way that the second projections 44 of the gearwheel 6 arranged therein can abut on the wall, i.e. the boundary, of the second recess section 52 in the longitudinal direction L of the linear guide device 1 in order to transmit a movement of the gearwheel 6 in the longitudinal direction L to the cage 4. In other words, the gearwheel 6 acts as a driver for the cage 4 during a movement in the longitudinal direction L.

The gearwheel 6 is not fastened on the cage 4 in the present embodiment of the linear device 1. In fact, the gearwheel 6 is respectively retained or fastened in the linear guide device 1 in a floating manner solely due to the interaction of the projections 43, 44 with the corresponding stopping faces formed on the rail 2 and the carriage 3.

Figure 6:
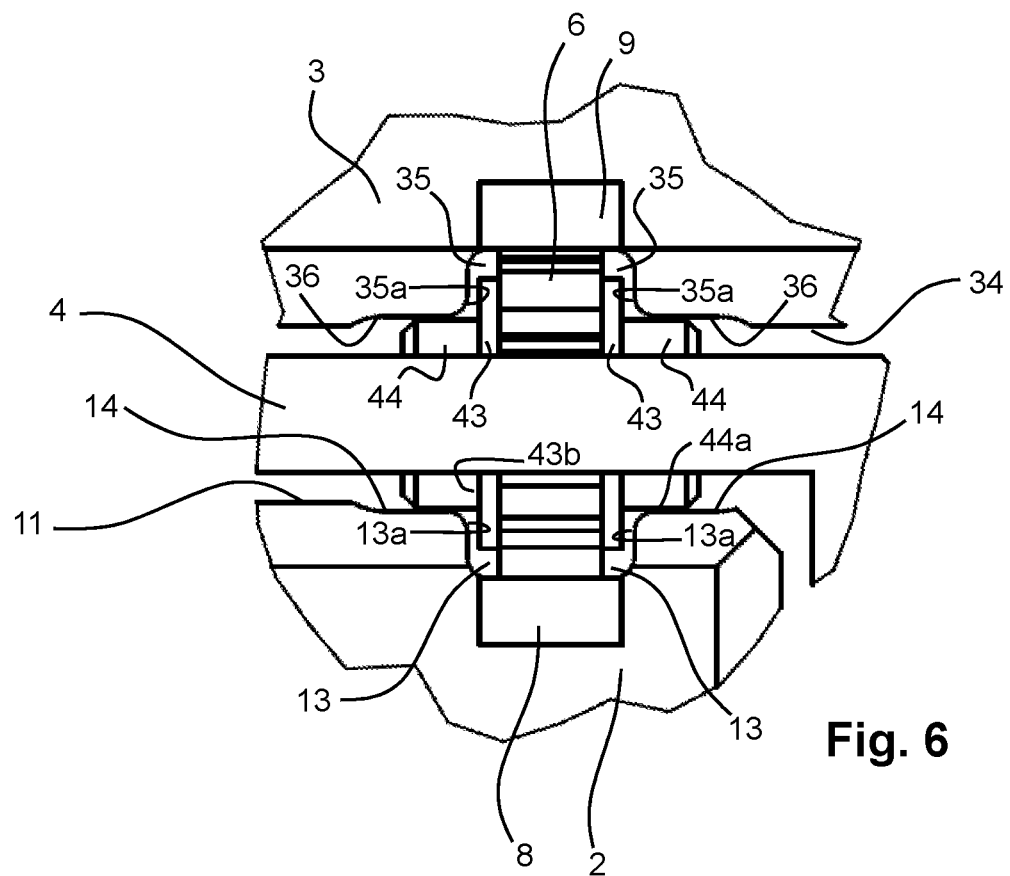
FIG. 6 shows a schematic and enlarged view of the region of the linear guide device identified by the reference symbol C in FIG. 5.
Figure 7:
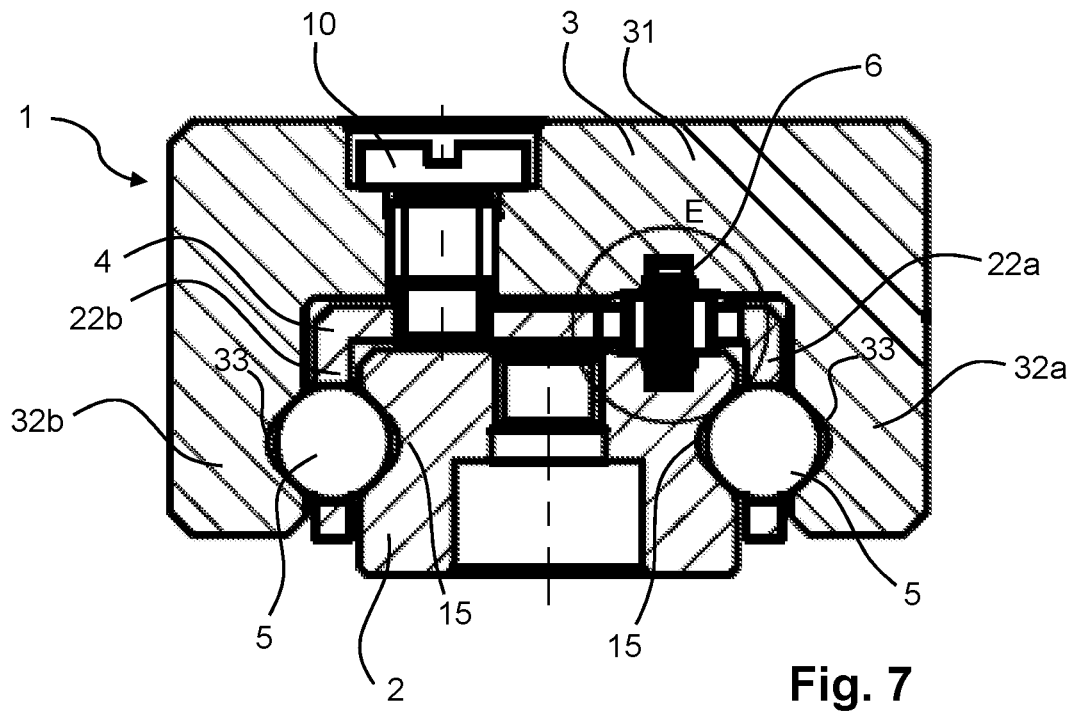
FIG. 7 shows a schematic view of the linear guide device illustrated in FIGS. 1-6 in the form of a section along the line F-F in FIG. 1.
Figure 8:
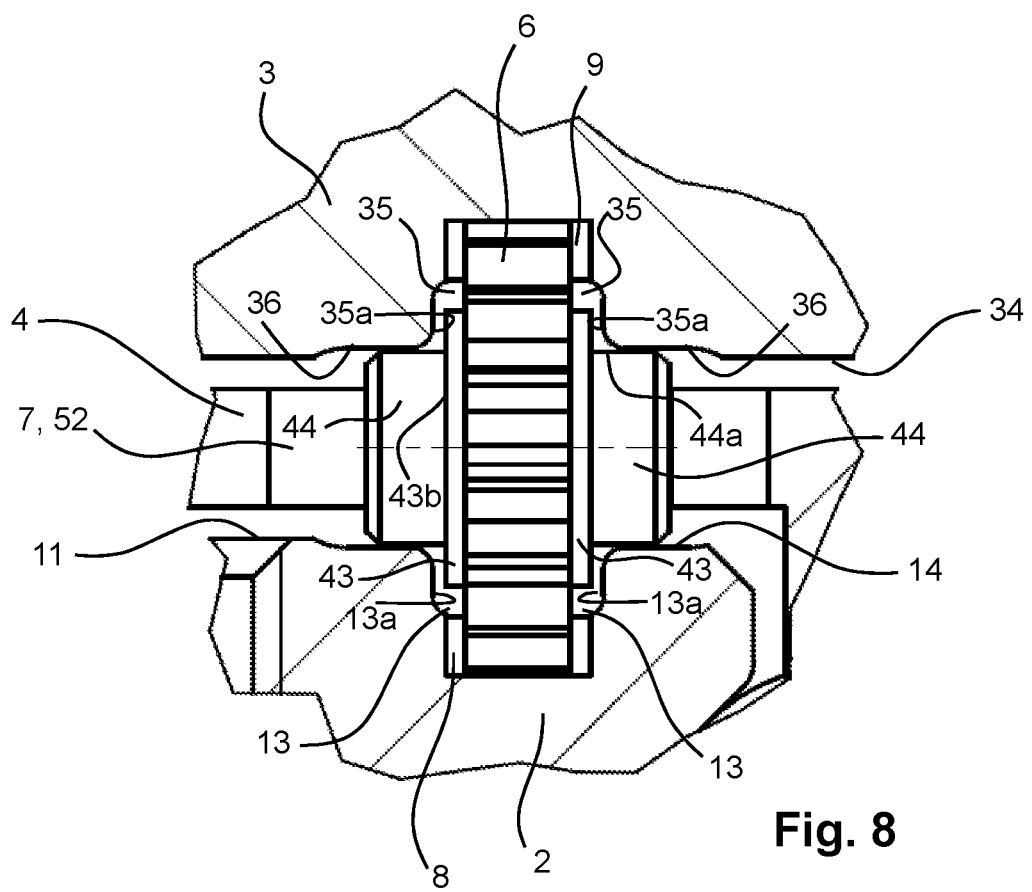
FIG. 8 shows a schematic and enlarged view of the region of the linear guide device identified by the reference symbol E in FIG. 7.

FIGS. 6 and 8, in particular, show that the end faces 43b of the two first projections 43 of the gearwheel 6 abut or abut in a spaced-apart manner on the sidewalls 13a, 35a of the grooves 13, 35 formed in the rail 2 and in the carriage 3. This prevents a movement of the gearwheel 6 perpendicular to the longitudinal direction L and parallel to the rail 2 and the carriage 3, namely a lateral movement of the gearwheel 6 in the present embodiment. In addition, the circumferential surfaces 44a of the two first projections 44 abut on the depressions 14, 36 formed in the underside 34 of the carriage 3 and the upper side 11 of the rail. This prevents a movement of the gearwheel 6 perpendicular to the longitudinal direction L and in the direction of the rail 2 or in the direction of the carriage 3, namely a vertical movement of the gearwheel 6 in the present embodiment.

In other words, the gearwheel 6 is retained in the linear guide device 1 in a floating and stationary manner with respect to movements perpendicular to the longitudinal direction L by the sidewalls 13a, 35a of the grooves 13, 35 and the stopping faces in the form of the depressions 14, 36 (or the underside 34 of the carriage 3 and the upper side 11 of the rail 2 themselves). Additional mounting of the gearwheel on the cage is not required.

During the operation of the linear guide device, the not-shown drive exerts a driving force upon the carriage 3 such that the carriage 3 moves relative to the rail 2 in the longitudinal direction L by a defined amount, which is also referred to as stroke. In the process, the gearwheel 6 rolls between the gear racks 8, 9 relative to the rail 2 along the longitudinal direction L by half of the travel of the carriage 3 (half stroke). During the movement of the gearwheel 6, its projections 43, 44 roll on the stopping faces of the carriage 3 and the rail 2 in a dragging manner. This makes it possible to prevent a movement of the gearwheel 6 perpendicular to the longitudinal direction L, i.e. in the vertical direction and in the lateral direction of the linear guide device. The circumferential surface 44a of the second projections comes in contact with the wall of the second recess section 52 of the recess 7 of the cage 4 and causes the cage 4 and the gearwheel 6 to be jointly moved relative to the rail 2 in the longitudinal direction L by half of the travel of the carriage 3 (half stroke). The movement of the cage 4 in the longitudinal direction L therefore is coupled with the movement of the carriage 3 along the rail 2. In other words, the gearwheel acts as a driver for the cage 4 during a movement in the longitudinal direction L.

Alternatively or additionally to providing the oblong opening 25, which interacts with the screw 10 and the ends of which in the longitudinal direction L form a limit stop for the movement of the cage 4 relative to the rail 2 and/or the carriage 3 in the longitudinal direction L, it is also possible to realize a limit stop by designing the grooves 13, 35 accordingly. For example, the grooves may have projections that act as a limit stop in the longitudinal direction L, wherein the gearwheel 6 comes in contact with said projections in order to limit the movement of the gearwheel 6 in the longitudinal direction L.

The present invention is not limited to the above-described embodiment of the linear guide device illustrated in the figures. Modifications of the linear guide device are in fact possible. For example, the individual elements may deviate from the described elements with respect to their size and/or shape. For example, the shape of the first projection 43 and/or the second projection 44 may deviate from a cylindrical shape.

Instead of providing the gearwheel, it would also be possible to use a different coupling element that is designed for simultaneously engaging into the first and the second advancing device of the rail and the carriage in order to cause a movement of the cage relative to the rail and/or the carriage during an advance of the carriage relative to the rail. Accordingly, the advancing devices may also be designed differently than the above-describe the gear racks. For example, the coupling element may be designed for a rotary advance in interaction with the advancing devices, wherein a rotational axis of the coupling element preferably extends perpendicular to the longitudinal direction of the rail and/or wherein the rotational axis preferably is fixed relative to the rail and the carriage.

Although only a few embodiments of the present invention have been shown and described, it is to be understood that many changes and modifications may be made thereunto without departing from the spirit and scope of the invention.

What is claimed is:

1. A linear guide device, comprising
a rail that has a first advancing device extending along a longitudinal direction,
a carriage displaceable relative to the rail along the longitudinal direction and having a second advancing device extending along the longitudinal direction,
a cage displaceable relative to the rail and the carriage along the longitudinal direction, and
a coupling element that is designed for simultaneously engaging into the first and the second advancing device in order to cause a movement of the cage relative to at least one of the rail and the carriage when the carriage is advanced relative to the rail along the longitudinal direction,
wherein the coupling element has at least one projection that interacts with a stopping face formed on at least one of the rail and the carriage in order to retain the coupling element in the linear guide device,
wherein the stopping face is a boundary of the carriage or the rail facing the cage in order to prevent a movement of the coupling element in the direction of the rail or the carriage,
wherein at least one of the rail and the carriage has a groove, and wherein the stopping face is formed by a wall of the groove in order to limit the movement of the coupling element parallel to the carriage or the rail, and
wherein the coupling element has at least one first projection, which abuts on the groove, and one second projection, which abuts on the boundary.

2. The linear guide device according to claim 1, wherein the coupling element comprises a gearwheel that is arranged in the linear guide device so as to be rotatable about a rotational axis, wherein the rotational axis extends transverse to the longitudinal direction and the at least one projection extends away from the gearwheel in the direction of the rotational axis.

3. The linear guide device according to claim 1, wherein the cage has a recess, through which the coupling element extends, and wherein the projection of the coupling element abuts on a boundary of the recess in order to cause the movement of the cage relative to at least one of the rail and the carriage.

4. The linear guide device according to claim 1, wherein the linear guide device has no mounting of the coupling element on the cage.

5. The linear guide device according to claim 1, wherein the at least one projection of the coupling element essentially is designed cylindrically, and wherein a diameter of the cylindrical projection is smaller than a diameter of the coupling element.

6. The linear guide device according to claim 1, wherein the boundary is at least one of an underside of the carriage and an upper side of the rail.

7. The linear guide device according to claim 1, wherein the groove extends in the longitudinal direction and is arranged laterally of the first or second advancing device.

8. The linear guide device according to claim 1, wherein a dimension of the first projection is greater than a dimension of the second projection.

9. The linear guide device according to claim 1, wherein the cage is arranged between the rail and the carriage.

10. The linear guide device according to claim 1, wherein the cage has a plurality of rolling bodies that respectively abut on the carriage and on the rail in a rollable manner.

11. The linear guide device according to claim 1, wherein the cage comprises a base body, and two legs (22a, 22b) that extend away from the base body (21) and are designed for receiving the rail in an intermediate space formed between the two legs.

12. The linear guide device according to claim 1, wherein the carriage essentially is designed in a U-shaped manner in a plane extending perpendicular to the longitudinal direction, and wherein the legs of the U-shaped carriage are designed for receiving the cage in an intermediate space formed between the two legs.

13. The linear guide device according to claim 1, furthermore comprising a limit stop that limits the movement of the cage relative to at least one of the rail and the carriage in the longitudinal direction.

14. The linear guide device according to claim 1, wherein at least one of the first advancing structure and the second advancing structure comprises a gear rack.

15. The linear guide device according to claim 1, furthermore comprising a drive that is designed for driving the carriage in a displaceable manner relative to the rail along the longitudinal direction.

* * * * *